Oct. 11, 1949.                    H. E. FEDER                    2,484,699

LAWN MOWER SHARPENER

Filed May 14, 1947.

INVENTOR.
Harold E. Feder
BY
S. Stephen Baker
HIS ATTORNEY.

Patented Oct. 11, 1949

2,484,699

UNITED STATES PATENT OFFICE 2,484,699

LAWN MOWER SHARPENER

Harold E. Feder, Union, N. J.

Application May 14, 1947, Serial No. 747,900

5 Claims. (Cl. 76—82.1)

This invention relates to sharpening devices and process of sharpening and is herein disclosed in some detail as embodied in a sharpening device especially adapted to sharpen and cut to proper alignment the usual lawn mower blades.

It has hitherto required considerable skill to sharpen and properly align the ordinary revolving cutting blades of a lawn mower so as to cooperate properly with its striker blade in cutting grass.

It has been attempted to sharpen the blades mounting the lawn mower in a frame and revolving the blades backwardly so that abrasive fed on the striker bar will grind the revolving blades.

Other devices have also been used, but they required considerable skill, were often set up so as to disalign the revolving blades and striker blade, and were in other ways unsatisfactory, sometimes having to be specially built to fit a given blade length of lawn mower.

According to the present invention, the foregoing and other objections and difficulties are overcome and a device is provided which needs no abrasive powder, can safely be put into the hands of almost anyone capable of handling a lawn mower, is capable of sharpening a lawn mower of almost any commercial type or size with the insertion of a single part, is rugged, and is simple to use.

In the form shown in some detail, the usual cutting edge embodied in the usual fixed striker blade is removed and replaced by a cutter assembly which is finely adjustable, and the outer face and gear of one of the drive wheels are removed, so the shaft of the revolving blades may be turned to bring the blades against the fixed cutter face to travel across it and be sharpened.

Other features and advantages will hereinafter appear.

Figure 1:
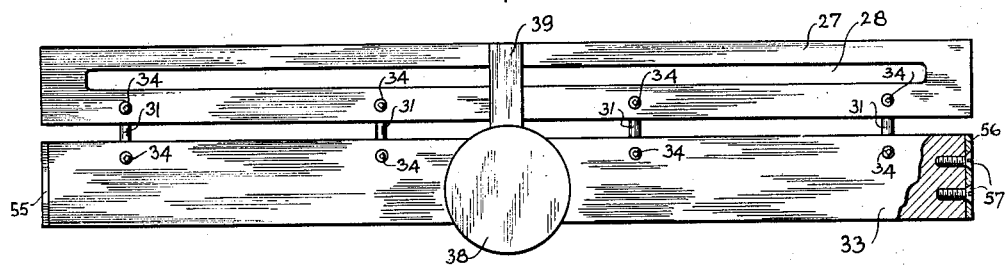
Fig. 1 is a top view of the cutter assembly.
Figure 2:
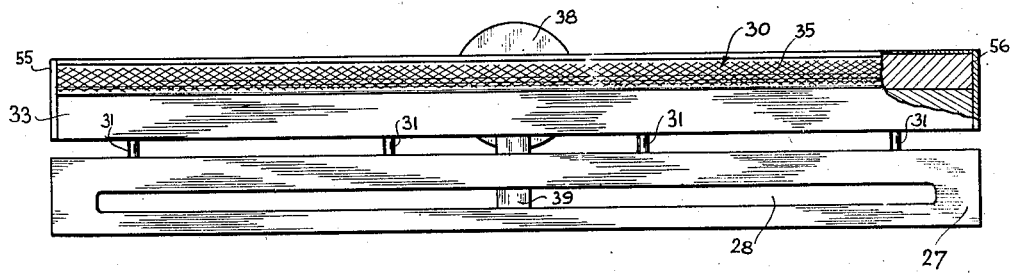
Fig. 2 is a bottom view of the same.
Figure 3:
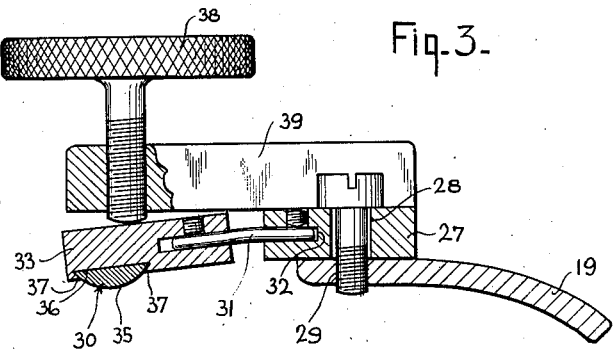
Fig. 3 is a sectional side view of the same showing fragmentarily its mounting.

To prepare a lawn mower for sharpening, its fixed striker blade is removed from the striker blade housing 19 and the cutter assembly is made fast on that housing with thumbscrews. To effect this, the cutter assembly includes, see Figs. 1, 2, 3, a slotted base member 27, adapted to fasten upon the housing 19 where the striker blade usually lies, and to be made fast to the housing by thumbscrews which pass freely through the slot 28 in the member 27, but thread into the usual threaded openings 29 into which are usually threaded the screws which usually hold the aforesaid striker blade to the housing 19. There are usually more than two threaded holes 29.

The slotted section or member 27 carries the tempered steel semi-oval cutter 30 on resilient holders or hinges, shown as spring steel dowels 31, forced into suitable openings in the reach 32 of the slotted member 27 and into the cutter holder 33. The cutter head assembly shown consists of two parts, member 27 and holder 33, joined by spring dowels for a hinge effect and maintained in normally substantially horizontal alignment thereby.

The dowels may be held by short counter-sunk setscrews 34 threaded into the reach 32 and holder 33 near the middle of the part of the dowels within the reach 32 and holder 33.

The hardened cutter surface 35 is shown as a segment of an oval member embedded in a groove 36 in the front portion or front face of holder 33, the groove having undercut edges 37 so that the cutter 35 is positively held in the holder.

The holder 33 is shown as vertically adjustable by forcing it down against the resiliency of the dowel 31 by turning a hand wheel 38 threaded into a central bracket 39 on the member 27 and bearing on the back of the holder 33. By having a hand wheel of a couple of inches in diameter, the thrust needed to depress the cutter 35 is easily obtained. Adjustment can be made while the apparatus is in operation.

The cutter 35 which may be in the form of a file-like member adapted to cut the blade edges, may be held in the groove 36 by an end abutment 55 at one end and plate 56 at the other end, screws 57 holding the plate 56.

The cutter surface is preferably so limited that the surface of the cutter 35 is smooth and slips easily where it underlies the undercut edges 37.

One advantage of a hard cutter surface is that the revolving blades tend to sharpen before they are really worn down if a speed of approximately 20 R. P. M. or less is used.

While there has been described what at present is considered a preferred embodiment of the invention, it will be evident that many changes and modifications may be made therein without departing from its spirit. It is therefore aimed in the appended claims to cover all such changes and modifications which fall within the true spirit and scope of the invention.

Having thus described in some detail one embodiment of the invention, what is claimed is:

1. A device for sharpening the revolving blades of a lawn mower having a fixed striker blade, said device comprising an elongated base member having a longitudinal slot formed therein for connection to the striker blade housing of the lawn mower, an elongated cutter holder, a cutter mounted on the front face thereof, said cutter holder being resiliently connected to said base member, so as to be in normally substantially horizontal alignment with said base member, said resilient connection comprising a series of short, resilient, metallic dowel devices spaced along and connecting the base member to the cutter holder, a bracket connected to said base member and extending over the rear portion of said cutter holder, a manually operated, vertically adjustable member maintained by said bracket and bearing against the rear portion of said cutter holder whereby the cutter holder may be depressed thereby against the action of said resilient dowel devices.

2. A device according to claim 1 and wherein said cutter extends completely across the front face of said cutter holder and along an outside edge thereof.

3. A device according to claim 2 and wherein said cutter comprises a semi-oval cutter device embedded in the front portion of said cutter holder, the cutting face of said cutter extending outwardly of said cutter holder to permit contact with the cutting surfaces of the revolving blades of the lawn mower.

4. A device for sharpening the revolving blades of a lawn mower comprising a base member having means to connect the same across the blades on the lawn mower so as to make contact with the cutting surfaces of the revolving blades, a cutter holder, a cutter resiliently connected to said base member, so as to be in normally substantially horizontal alignment with said base member, said resilient connection comprising resilient means between said base member and cutter holder whereby said cutter holder may be actuated in a substantially vertical plane relative to said base member so as to adjust the vertical position of said cutter holder, and a manually operated member bearing against said cutter holder so as to effect said adjustment in a substantially vertical plane, said resilient means comprising a plurality of relatively short dowel devices interconnecting said base member and cutter holder along spaced points thereof.

5. A device according to claim 4 and including a bracket connected to said base member and in which said manually operated member reciprocates in a vertical direction, said bracket member and manually operated member being complementarily threaded to permit such vertical reciprocation.

HAROLD E. FEDER.

REFERENCES CITED

The following references are of record in the file of this patent:

UNITED STATES PATENTS

| Number | Name | Date |
|---|---|---|
| 498,219 | Bush | May 23, 1893 |
| 579,500 | Slaght | Mar. 23, 1897 |
| 965,926 | Neff | Aug. 2, 1910 |
| 1,086,389 | Miller | Feb. 10, 1914 |
| 1,091,750 | Miller | Mar. 31, 1914 |
| 1,866,794 | Bierman | July 12, 1932 |
| 2,110,637 | Simmons et al. | July 11, 1935 |